(12) United States Patent
Ahn et al.

(10) Patent No.: US 7,532,133 B2
(45) Date of Patent: *May 12, 2009

(54) METHODS AND APPARATUSES FOR GENERATING AND RECOVERING 3D COMPRESSION DATA

(75) Inventors: Jeonghwan Ahn, Suwon-si (KR); Mahnjin Han, Yongin-si (KR); Dokyoon Kim, Seongnam-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 11/401,412

(22) Filed: Apr. 11, 2006

(65) Prior Publication Data

US 2006/0227023 A1    Oct. 12, 2006

Related U.S. Application Data

(60) Provisional application No. 60/669,927, filed on Apr. 11, 2005, provisional application No. 60/676,972, filed on May 3, 2005, provisional application No. 60/700,320, filed on Jul. 19, 2005.

(51) Int. Cl.
*H03M 7/38* (2006.01)

(52) U.S. Cl. .................. 341/51; 341/50; 382/232; 382/154; 345/418; 345/424

(58) Field of Classification Search ............ 341/50–90; 348/554, 558; 375/240.08; 382/232, 154; 345/424, 419, 418
See application file for complete search history.

(56) References Cited

U.S. PATENT DOCUMENTS 5,057,940 A * 10/1991 Murakami et al. .......... 382/243
6,377,309 B1 * 4/2002 Ito et al. ..................... 348/554
6,563,500 B1 * 5/2003 Kim et al. ................... 345/423
6,571,018 B1 * 5/2003 Kim .......................... 382/245
7,136,415 B2 * 11/2006 Yun et al. ................ 375/240.26
7,224,729 B1 * 5/2007 Jang et al. ............... 375/240.08
2001/0028744 A1 * 10/2001 Han et al. ................... 382/232
2004/0111171 A1 * 6/2004 Jang et al. ..................... 700/94
2004/0236859 A1 * 11/2004 Leistad et al. ............... 709/230
2006/0257016 A1 * 11/2006 Shioi et al. .................. 382/154

FOREIGN PATENT DOCUMENTS

JP          10164448      *  6/1998    ............... 341/50

OTHER PUBLICATIONS

Tran et al., "Exploring MPEG-4 BIFS Features For Creating Multimedia Games", XP-002511388, Artemis Project Unit, Evry-France, 2003 IEEE, pp. 429-432 (in English).
Signès et al., "MPEG-4's Binary Format for Scene Description", XP-002133302, Jan. 11, 2000, pp. 22 (in English).
European Search Report for corresponding European Patent Application No.:06747340.5 dated Feb. 5, 2009, 5 pages (in English).

* cited by examiner

*Primary Examiner*—Lam T Mai
(74) *Attorney, Agent, or Firm*—Staas & Halsey LLP

(57) ABSTRACT

A method of generating three-dimensional (3D) compression data, and an apparatus to perform the method, the method including generating configuration information of the 3D compression data; generating a plurality of pieces of individual 3D compression data to be included in the 3D compression data; and generating the 3D compression data by multiplexing the pieces of individual 3D compression data, combining the 3D compression data with the configuration information, and outputting the result of the combination.

35 Claims, 5 Drawing Sheets

METHODS AND APPARATUSES FOR GENERATING AND RECOVERING 3D COMPRESSION DATA

CROSS-REFERENCE TO RELATED APPLICATIONS

This application claims the benefit of U.S. Provisional Application No. 60/669,927, filed on Apr. 11, 2005, U.S. Provisional Application No. 60/676,972, field on May 3, 2005, and U.S. Provisional Application No. 60/700,320, field on Jul. 19, 2005, in the United States Patent & Trademark Office, the disclosures of which are incorporated herein by reference.

BACKGROUND OF THE INVENTION

1. Field of the Invention

The present invention relates to a method of generating three-dimensional (3D) graphic compression data, and an apparatus to perform the method, and a method of recovering 3D graphic compression data, and an apparatus to perform the method, and, more particularly, to a method of generating 3D graphic compression data, and an apparatus to perform the method, and a method of recovering 3D graphic compression data, and an apparatus to perform the method, in a mobile environment.

2. Description of the Related Art

The current state of the evolution of mobile devices allows some services, such as 3D games, 3D avatars, or 3D shopping, which were previously considered to be impossible or impractical in a mobile environment, to be provided. As a result, such services have been recognized as new business models to be used in mobile communications or content providers.

However, the mobile devices are limited in terms of computational complexity and power consumption, and a bandwidth of a wireless network is also limited. Thus, an efficient method of representing and compressing 3D graphic data is needed to overcome these limitations in a mobile environment.

SUMMARY OF THE INVENTION

The present invention provides a method of generating three-dimensional (3D) graphic compression data, and an apparatus to perform the method, and a method of recovering 3D graphic compression data, and an apparatus to perform the method, in order to compactly represent the 3D graphic data and effectively transmit the data via a wireless network in a mobile environment that is restricted in power consumption and computational complexity.

Additional aspects and/or advantages of the invention will be set forth in part in the description which follows and, in part, will be apparent from the description, or may be learned by practice of the invention.

According to an aspect of the present invention, there is provided a method of generating three-dimensional (3D) compression data, the method comprising generating configuration information of the 3D compression data; generating a plurality of pieces of individual 3D compression data to be included in the 3D compression data; and generating the 3D compression data by multiplexing the pieces of individual 3D compression data, combining the 3D compression data with the configuration information, and outputting the result of the combination.

According to another aspect of the present invention, there is provided a method of recovering three-dimensional (3D) compression data, the method including separating the 3D compression data and configuration information of the 3D compression data from a received signal; separating a plurality of pieces of individual 3D compression data and individual configuration information of the pieces of individual 3D compression data from the 3D compression data; and decoding the pieces of individual 3D compression data by using data type information of the 3D compression data, which is included in the individual configuration information.

According to another aspect of the present invention, there is provided an apparatus to generate three-dimensional (3D) compression data, the apparatus comprising a plurality of encoders which encode received 3D data according to different methods and generate different types of pieces of individual 3D compression data; and a multiplexer which generates configuration information of the 3D compression data and individual configuration information of the pieces of individual 3D compression data, receives the pieces of individual 3D compression data from the encoders and respectively combines the pieces of individual 3D compression data with the corresponding individual configuration information, generates the 3D compression data by multiplexing the combined data, and combines the 3D compression data with the configuration information and outputs the result of the combination.

According to another aspect of the present invention, there is provided an apparatus to recover three-dimensional (3D) compression data, the apparatus comprising a demultiplexer which separates the 3D compression data and configuration information of the 3D compression data from a received signal, separates a plurality of pieces of individual 3D compression data and individual configuration information of the pieces of individual 3D compression data from the 3D compression data, and analyzes a data type code comprising data type information of the individual 3D compression data, the data type code being included in the individual configuration information; and a plurality of decoders which recover 3D graphic data by decoding the pieces of individual 3D compression data according to the corresponding data type code.

According to another aspect of the present invention, there is provided a method of generating three-dimensional (3D) compression data, the method comprising generating configuration information of a 3DCObjectSequence, which is the 3D compression data; generating 3DCObjects, which are a plurality of pieces of individual 3D compression data that are included in the 3D compression data; and generating the 3D compression data by multiplexing the pieces of individual 3D compression data, combining the 3D compression data with the configuration information, and outputting the result of the combination. The generation of configuration information of the 3D compression data, the generation of the pieces of individual 3D compression data, and the generation of the 3D compression data are realized by:

```
3DCObjectSequence( ) {
    bit(32) 3dc_object_sequence_start_code;
    bit(8)  profile_and_level_indication;
    do {
        3DCObject( );
        bit(32) *next;
    } while ( next != 3dc_object_sequence_end_code);
    bit(32) 3dc_object_sequence_end_code;
},
``` wherein 3dc_object_sequence_start_code denotes code representing a start of the 3D compression data, profile_and_level_indication denotes profile and level identification information of the 3D compression data, and 3dc_object_sequence_end_code denotes code representing an end of the 3D compression data.

According to another aspect of the present invention, there is provided a method of generating three-dimensional (3D) compression data, the method comprising generating configuration information of the 3D compression data; generating a combination of individual configuration information of an individual 3D compression object included in the 3D compression data with the individual 3D compression object corresponding to the individual configuration information, and repeatedly generating the combination; and multiplexing the combinations to obtain a piece of data, and including the configuration information in the obtained data.

According to another aspect of the present invention, there is provided a method of recovering three-dimensional (3D) compression data, the method comprising separating the 3D compression data and configuration information of the 3D compression data from a received signal; separating combinations of individual configuration information and individual 3D compression objects from the 3D compression data, and separating the individual 3D compression objects and the individual configuration information from the separated combinations; and recovering 3D data by decoding the individual 3D compression objects using data type information of the individual 3D compression objects, the data type information being included in the individual configuration information.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE PREFERRED EMBODIMENTS

Figure 1:
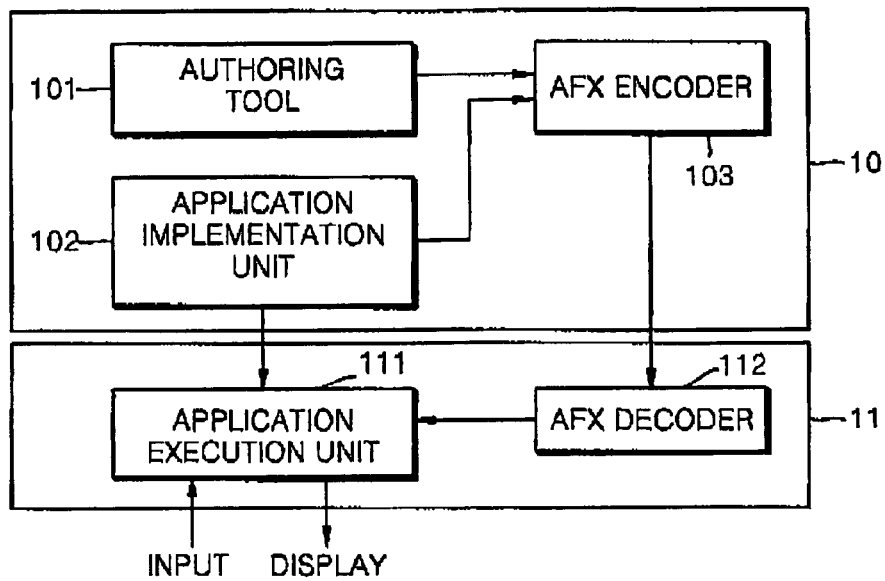
FIG. 1 is a schematic block diagram illustrating a three-dimensional (3D) graphic system according to an embodiment of the present invention.

Reference will now be made in detail to the embodiments of the present invention, examples of which are illustrated in the accompanying drawings, wherein like reference numerals refer to the like elements throughout. The embodiments are described below to explain the present invention by referring to the figures.

FIG. 1 is a schematic block diagram illustrating a three-dimensional (3D) graphic system according to an embodiment of the present invention. 3D graphics may include mobile 3D applications, such as, for example, a 3D game, a 3D graphic user interface (GUI), or a 3D avatar. Referring to FIG. 1, the system includes a 3D graphic authoring device 10 and a 3D graphic operation device 11.

The 3D graphic authoring device 10 includes an authoring tool 101, an application implementation unit 102, and an AFX (Animation Framework eXtension) encoder 103.

The authoring tool 101 creates 3D resources. The 3D resources may include, for example, a 3D mesh, a key-frame sequence, or bone information.

The application implementation unit 102 outputs scene graph information used to display content stored in a data structure in a screen according to a user's input, an interaction with a user, scene management, Open GL, which is a graphic library, and GFX or DirectX, which are application program interfaces.

The AFX encoder 103 compresses some of the 3D resources from the authoring tool 101, or the information from the application implementation unit 102, and transmits the compression result.

The 3D graphic operation device 11 includes an application execution unit 111 and an AFX decoder 112.

The application execution unit 111 receives and executes the information from the application implementation unit 102, or executes the 3D resources recovered by the AFX decoder 112.

Figure 2:
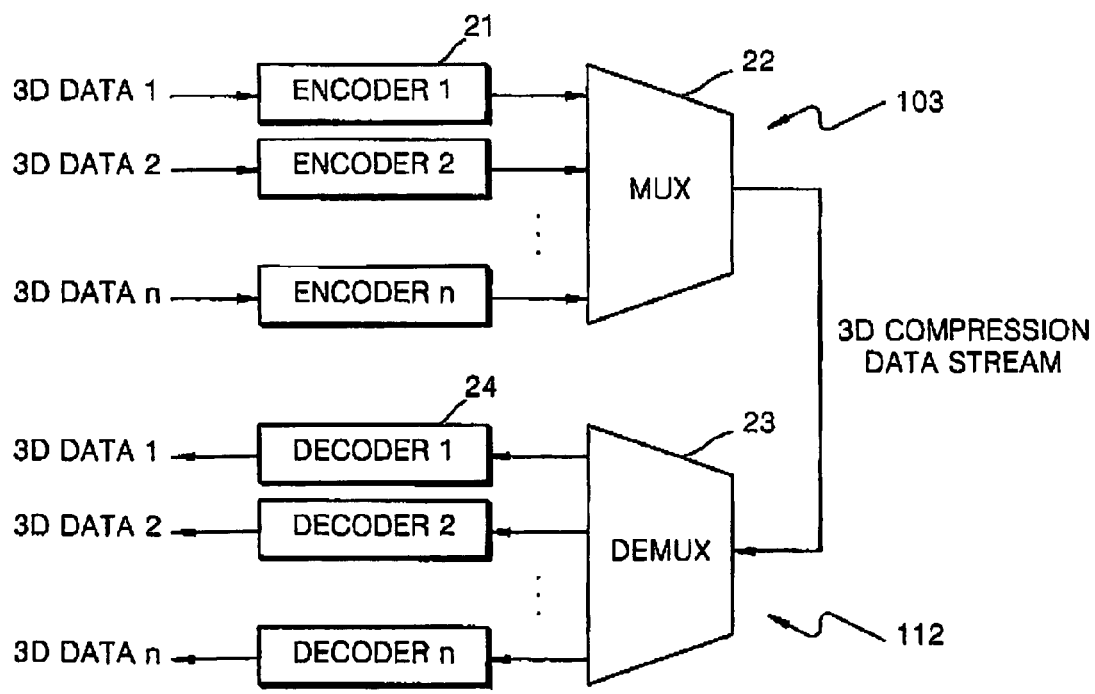
FIG. 2 is a detailed block diagram illustrating an AFX encoder and an AFX decoder according to an embodiment of the present invention.

FIG. 2 is a detailed block diagram illustrating the AFX encoder 103 and the AFX decoder 103 illustrated in FIG. 1, according to an embodiment of the present invention. The AFX encoder 103 includes a plurality of encoders 21 and a multiplexer (MUX) 22. The AFX decoder 112 includes a demultiplexer (DEMUX) 23 and a plurality of decoders 24.

Each of the encoders 21 compresses received 3D data into a compressed bitstream, and the multiplexer 22 multiplexes the compressed bitstreams to a compressed data stream. Each encoder 21 encodes the received 3D data according to the type of an object, e.g., through, for example, 3D mesh coding (3DMC), interpolator coding (IC), wavelet subdivision surface (WSS), or bone-based animation (BBA).

The demultiplexer 23 demultiplexes the compressed data stream into the compressed bitstream, and each of the decoders 24 recovers the original data from the compressed data.

Figure 3:
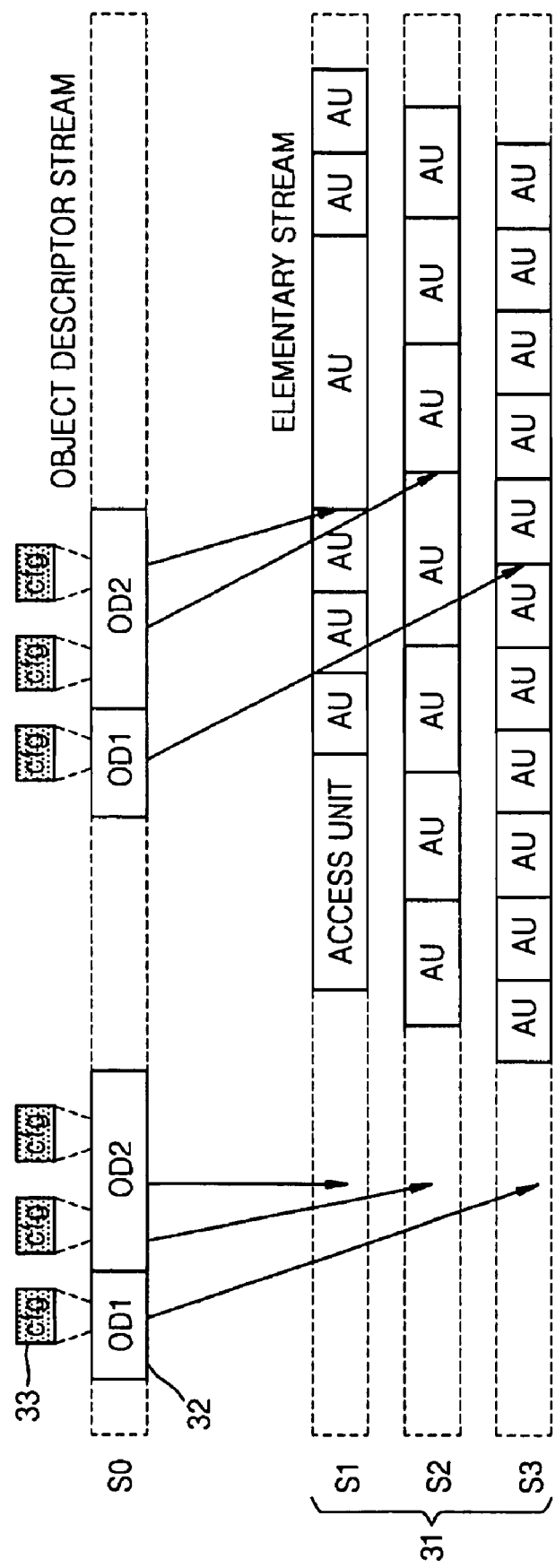
FIG. 3 is a diagram illustrating a structure of compression data according to an MPEG-4 profile based on an MPEG-4 system.

FIG. 3 is a diagram illustrating a structure of compression data according to an MPEG-4 profile based on an MPEG-4 system. Referring to FIG. 3, according to the specification of a system part of the ISO/IEC (International Organization for Standardization/International Electrotechnical Commission) 14496-1, an MPEG-4 system (not shown) inserts an object descriptor 32, which describes the characteristics of a media object (audio or video) and the characteristics of an elementary stream, into an elementary stream 31 comprised of access units (AUs). Configuration information 33 is inserted into the object descriptor 32.

The specification of the system part of the ISO/IEC 14496-1 specifies separate encoding of video data and audio data, and multiplexing and synchronizing of the encoded data in order to store multimedia data in a file or a recording medium or transmit it via a network. It is an MPEG-4 system that defines the data multiplexing. Video or audio binary data that has yet to be multiplexed by the system is referred to as the elementary stream.

In the MPEG-4 standard, object encoding is used to multiplex audio and video data. In this case, both audio data and video data are processed as a single object, and the system multiplexes and synchronizes the objects.

The MPEG-4 standard defines BIFS (Binary Format for Scenes) as a feature used in a scene description by combining and processing a plurality of objects. For example, moving picture data and audio data of a person or a background are encoded as separate objects. Thus, an application can be made, so that the encoded objects are displayed to overlap each other, or a user can move any object.

However, when an application is downloaded and stored by using most basic tools in a mobile environment, the profile illustrated in FIG. 3 is tightly coupled with an MPEG-4 system having a BIFS structure. That is, the profile is inefficient since the MPEG-4 system must be prepared to decode a bitstream encoded by an MPEG-4 AFX tool, thereby increasing the load on the hardware.

Therefore, in an embodiment of the present invention, a 3D compression profile that does not require an MPEG-4 system is adopted. In 3D compression data according to an embodiment of the present invention, configuration information, i.e., header information of an object, is inserted into a start of a bitstream, and, optionally, repeatedly inserted into the bitstream after the start of the bitstream.

Figure 4:
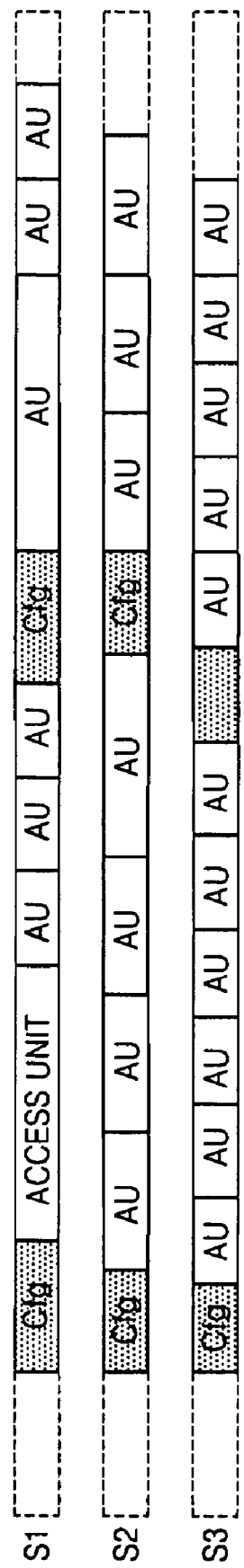
FIG. 4 is a diagram illustrating a structure of a 3D compression data stream according to an embodiment of the present invention.

FIG. 4 is a diagram illustrating a structure of a 3D compression data stream according to an embodiment of the present invention. Referring to FIG. 4, an elementary system includes objects, each having a plurality of access units, and configuration information Cfg of each object.

The data structure illustrated in FIG. 4 is obtained by making an object by encoding 3D data by each of the encoders 21 of FIG. 2 according to the type of the object, and inserting configuration information into each of the objects and multiplexing the objects by the multiplexer 22. Here, the types of the objects may include, for example, 3D mesh coding (3DMC), a coordinate interpolator (CI), an orientation interpolator (OC), a wavelet subdivision surface (WSS), a position interpolator (PI), and bone-based animation (BBA), which are suggested in the MPEG-4 standard.

Figure 5:
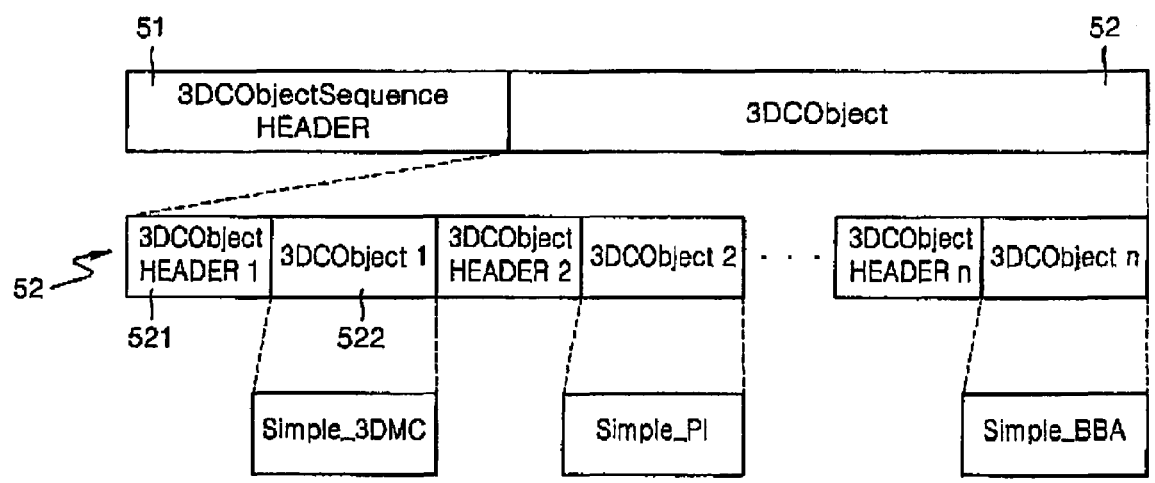
FIG. 5 is a diagram illustrating the structure of a bitstream multiplexed by a multiplexer of FIG. 2.

FIG. 5 is a diagram illustrating a data structure of a bitstream multiplexed by the multiplexer 22 of FIG. 2. The illustrated bitstream is a 3DCObjectSequence that includes a 3DCObjectSequence header 51 and a 3DCObject 52. The 3DCObjectSequence header 51, which is generated by the multiplexer 22, includes profile and level identification of the bitstream. The 3DCObjectSequence header 51 may further include user data defined for a specific application by a user, e.g., scene graph information for the bitstream, which will be described in detail with reference to FIGS. 6A and 6B.

Figure 6A:
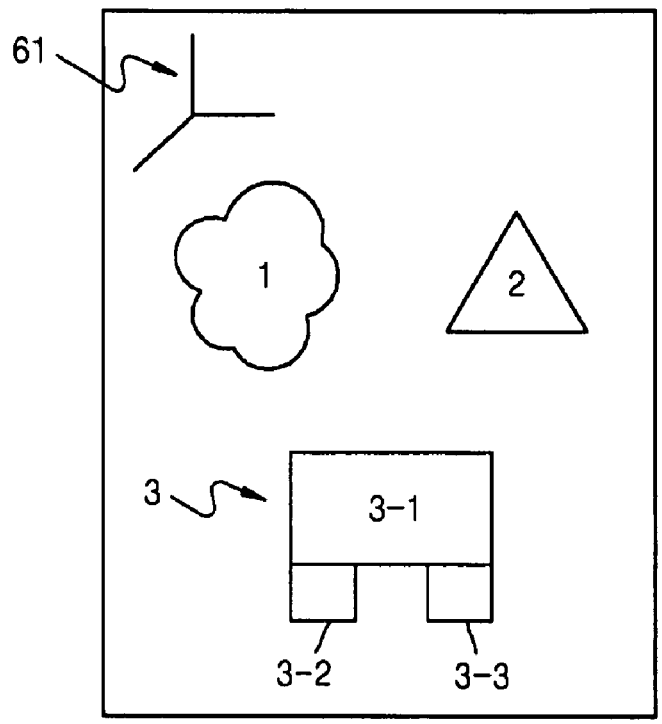
FIG. 6A is a diagram illustrating an example of a scene.
Figure 6B:
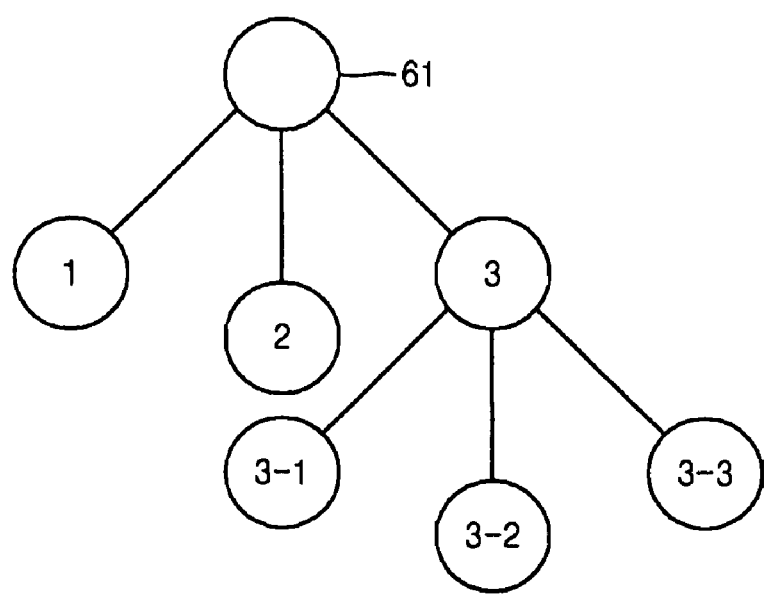
FIG. 6B is a graph illustrating the structure of objects included in the scene illustrated in FIG. 6A.

FIG. 6A is a diagram illustrating an example of a scene. FIG. 6B is a graph illustrating the structure of objects included in the scene illustrated in FIG. 6A. Referring to FIG. 6A, the scene includes objects 1 through 3 defined in world coordinates 61, and the object 3 includes detailed objects 3-1, 3-2, and 3-3. For example, the objects 1 through 3 may be a building, a tree, and a chair, respectively, and the detailed objects 3-1 through 3-3 of the object 3 may respectively be a ball on the chair and the legs of the chair.

The scene illustrated in FIG. 6A may be represented as graph information as illustrated in FIG. 6B. Referring to FIG. 6B, the world coordinates 61 are linked to objects 1 through 3, and the object 3 is linked to detailed objects 3-1, 3-2, and 3-3.

The scene graph information illustrated in FIGS. 6A and 6B may be included as user data in the 3DCObjectSequence header 51 of FIG. 5. For example, the objects 1 through 3, linked to the world coordinates 61, may be included in the user data as the objects for configuring a scene, e.g., a building, a tree, and a chair, and the detailed objects 3-1 through 3-3, which comprise the chair 3, may also be included in the user data as a ball on the chair and the legs of the chair, respectively.

The 3D compression object 3DCObject 52 includes a plurality of 3DCObject headers 521, and a plurality of individual 3DCObjects 522. Here, each of the 3DCObjects 522 is a 3D compression bitstream, such as 3DMC Simple_3DMC, IC (not shown), BBA Simple_BBA, WSS (not shown), and PI Simple_PI, which is encoded by the encoders 21.

The 3DCObject header 521, which is generated by the multiplexer 22, includes a "3dc_object_verid" field describing the version number of a tool list of a 3D compression object type, and a "3dc_object_type_start_code" field that is used in resynchronization and describes the object type of a 3D compression stream to be transmitted and the type of a decoder matching the 3D compression stream. For example, if the "3dc_object_type_start_code" field is a "Simple_3DMC" field, the demultiplexer 23 analyzes the "3dc_object_type_start_code" field and outputs the 3D compression stream to a 3DMC decoder, which is one of the decoders 24, and the 3DMC decoder decodes the received 3D compression stream. New object types and a corresponding "3dc_object_type_start_code" field may be defined and extended to define more object types and corresponding decoders.

The 3DCObject header 521 may further include user data that a user defines for a specific application for the 3D compression object. For example, in FIGS. 6A and 6B, a building, a tree, and a chair may be included in a 3DCObject header 1, a 3DCObject header 2, and a 3DCObject header 3, respectively.

A process of generating a 3D compression object sequence by using the multiplexer 22 is expressed with the following code:

```
3DCObjectSequence( ) {
    bit(32)    3dc_object_sequence_start_code;
    bit(8)     profile_and_level_indication;
    bit(32)    *next;
    while (next== user_start_code){
        user_data( );
    }
    do {
        3DCObject( );
        bit(32) *next;
    } while ( next != 3dc_object_sequence_end_code);
    bit(32)    3dc_object_sequence_end_code;
}
```

In the above code, 3dc_object_sequence_start_code is a hexadecimal number system of a bit string '000001A0', and starts a 3D compression session. In this case, the Mnemonic is bslbf. The Mnemonic describes the type of data available for a coded bitstream, and bslbf stands for a bit string, left bit first.

profile_and_level_indication is an 8-bit integer used to signal the profile and level identification of the bitstream, and the meaning of each bit value is indicated in the following table:

TABLE 1

| Profile/Level | Code |
| --- | --- |
| Reserved | 00000000 |
| core profile/level 1 | 00000001 |
| core profile/level 2 | 00000010 |

TABLE 1-continued

| Profile/Level | Code |
|---|---|
| Reserved | 00000011 |
| . | . |
| . | . |
| . | . |
| Reserved | 11111111 |

In this case, the mnemonic is uimsbf, which stands for unsigned integer, most significant bit first.

user_start_code is a hexadecimal number system of a bit string '000001A4', and indicates the start of the user data. The user data is continuously generated until another start code is received. In this case, mnemonic is bslbf.

3dc_object_sequence_end_code is a hexadecimal number system of a bit string '000001A1', and ends the 3D compression session. In this case, the mnemonic is bslbf.

To generate the 3D compression object sequence, when the 3D compression session starts, user data is generated according to a given profile and level during a period of time in which a next bit is user_start_code, and 3DCObject is generated during a period of time in which a next bit is not 3dc_object_sequence_end_code.

A process of generating the 3D compression object is expressed with the following code:

```
3DCObject( ) {
    bit(32)  3dc_object_start_code;
    bit(1)   is_3dc_object_identifier;
    bit(3)   3dc_object_verid;
    bit(4)   3dc_object_priority;
    bit(32)  *next;
while ( next== user_start_code){
    user_data( );
}
bit(32) *next;
if (next == "Simple_3DMC") {
    bit(32) 3dc_object_type_start_code;
    3D_Mesh_Object( );
}
else if (next == "Simple_WSS") {
    bit(32) 3dc_object_type_start_code;
    Wavelet_Mesh_Object( )
}
else if (next == "Simple_CI") {
    bit(32) 3dc_object_type_start_code;
    CompressedCoordinateInterpolator( )
}
else if (next == "Simple_OI") {
    bit(32) 3dc_object_type_start_code;
    CompressedOrientationInterpolatort( )
}
else if (next == "Simple_PI") {
    bit(32) 3dc_object_type_start_code;
    CompressedPositionInterpolator( )
}
else if (next == "Simple_BBA"){
    bit(32) 3dc_object_type_start_code;
    bba_object( )
}
}
```

In the above code, 3dc_object_start_code is a hexadecimal number system of a bit string '000001A2', and starts a 3D compression object. In this case, the mnemonic is bslbf.

is_3dc_object_identifier is a 1-bit code, and set to '1' when the version identification and priority of a 3D compression object are defined. In this case, the mnemonic is uimsbf.

3dc_object_verid is a 4-bit code that represents the version number of the 3D compression object. The meanings of the bit values are shown in the following table. If 3dc_object_verid does not exist, the value of 3dc_object_verid is '0001'. In thiscase, the mnemonic is uimsbf.

TABLE 2

| 3dc_object_verid | Meaning |
|---|---|
| 0000 | reserved |
| 0001 | object type listed in Table 3 |
| 0010-1111 | reserved |

Table 3 shows a tool list included in each object type. Current object types may be extended until new tools or functionalities are introduced.

TABLE 3

| | 3D Compression Object Type | | | | | | |
|---|---|---|---|---|---|---|---|
| AFX Tool | Simple 3DMC | Simple CI | Simple PI | Simple OI | Simple WSS | Simple BBA | reserved |
| 3DMC | X | | | | | | |
| CI | | X | | | | | |
| PI | | | X | | | | |
| OI | | | | X | | | |
| WSS | | | | | X | | |
| BBA | | | | | | X | |
| reserved | | | | | | | |

3dc_object_priority is a 3-bit code representing the priority of the 3D compression object. 3dc_object_priority has a value between 1 and 7. Here, '1' represents the highest priority, and '7' represents the lowest priority. '0' is a reserved value. In this case, the mnemonic is uimsbf.

3dc_object_type_start_code is a 32-bit bit string. The first 24 bits of 3dc_object_type_start_code are '0000 0000 0000 0000 0000 0001', which is used in resynchronization. The last 8 bits include values of 'A6' or 'AB', and represent the object types listed in Table 4. In this case, the mnemonic is bslbf.

A related decoder is called and the compressed stream is decoded according to the last 8 bits of 3dc_object_type_start_code. If more object types are further defined in Table 3, they are reflected in Table 4.

TABLE 4

| 3dc_object_type_start_code | Code (hexadecimal) |
|---|---|
| Reserved | A5 |
| Simple 3DMC | A6 |
| Simple CI | A7 |
| Simple PI | A8 |
| Simple OI | A9 |
| Simple WSS | AA |
| Simple BBA | AB |
| Reserved | AC through AF |

To generate the 3D object, when a session starts, user data is generated according to the version and priority of the 3D compression object during a period of time in which a next bit is user_start_code. Next, an object is generated according to the type of the corresponding 3D object.

A process of generating the user data is expressed with the following code:

```
user_data( ) {
    bit(23)  *next;
    while(next !=0){
        bit(8)  user_data_bits;
        bit(23) *next;
    }
}
``` user_data_bits is an 8-bit integer that is defined for a specific application by a user. If there are a series of user_data_bits, a bit string of 23 or more consecutive '0's is not allowed.

In addition to the above-described embodiments, the method of the present invention can also be implemented by executing computer readable code/instructions in/on a medium, e.g., a computer readable medium. The medium can correspond to any medium/media permitting the storing and/or transmission of the computer readable code. The code/instructions may form a computer program.

The computer readable code/instructions can be recorded/transferred on a medium in a variety of ways, with examples of the medium including magnetic storage media (e.g., ROM, floppy disks, hard disks, etc.), optical recording media (e.g., CD-ROMs, or DVDs), and storage/transmission media such as carrier waves, as well as through the Internet, for example. The medium may also be a distributed network, so that the computer readable code/instructions is stored/transferred and executed in a distributed fashion. The computer readable code/instructions may be executed by one or more processors.

As described above, according to the present invention, in a mobile environment being limited in power consumption and computational complexity, it is possible to effectively compress 3D graphic data and transmit the compressed 3D graphic data via a wireless network without an MPEG-4 system.

Although a few embodiments of the present invention have been shown and described, it would be appreciated by those skilled in the art that changes may be made in these embodiments without departing from the principles and spirit of the invention, the scope of which is defined in the claims and their equivalents.

What is claimed is:

1. A method of generating three-dimensional (3D) compression data, the method comprising:
   generating configuration information of the 3D compression data;
   generating a plurality of pieces of individual 3D compression data to be included in the 3D compression data and individual configuration information of the pieces of individual 3D compression data; and
   combining the pieces of individual 3D compression data with the corresponding individual configuration information and multiplexing the combined data; and
   generating the 3D compression data by combining the multiplexed result with the configuration information and outputting the result of the combination.

2. The method of claim 1, wherein the configuration information comprises profile and level identification information of the 3D compression data.

3. The method of claim 2, wherein the configuration information further comprises user data defining applications of the 3D compression data.

4. The method of claim 3, wherein the user data comprises scene graph information representing objects included in a scene by using a graph in response to the 3D compression data being graphic data.

5. The method of claim 1, wherein the generation of the pieces of individual 3D compression data comprises:
   generating the pieces of individual 3D compression data according to a data type.

6. The method of claim 5, wherein the individual configuration information comprises:
   a version number of a tool list of the data type; and
   data type code containing information regarding the data type.

7. The method of claim 6, wherein the individual configuration information further comprises user data defining applications of the individual 3D compression data.

8. The method of claim 5, wherein the pieces of individual 3D compression data are generated by encoding 3D data according to an encoding method corresponding to code representing the data type.

9. The method of claim 8, wherein the data type code further comprises a plurality of bits used in resynchronization.

10. A method of recovering three-dimensional (3D) compression data, the method comprising:
    separating the 3D compression data and configuration information of the 3D compression data from a received signal;
    demultiplexing a plurality of pieces of individual 3D compression data and individual configuration information of the pieces of individual 3D compression data from the 3D compression data; and
    decoding the pieces of individual 3D compression data using data type information of the 3D compression data, which is included in the individual configuration information.

11. The method of claim 10, wherein the individual configuration information comprises profile and level identification information of the 3D compression data.

12. The method of claim 11, wherein the configuration information further comprises user data defining applications of the 3D compression data.

13. The method of claim 10, wherein the individual configuration information comprises:
    a version number of a tool list of a data type of the of the pieces of individual 3D compression data; and
    a data type code containing information regarding the data type.

14. The method of claim 13, wherein the individual configuration information further comprises user data defining applications of the pieces of individual 3D compression data.

15. The method of claim 13, wherein the data type code further comprises a plurality of bits used in resynchronization.

16. An apparatus to generate three-dimensional (3D) compression data, the apparatus comprising:
    a plurality of encoders which encode received 3D data according to different methods, and generate different types of pieces of individual 3D compression data; and
    a multiplexer which generates configuration information of the 3D compression data and individual configuration information for the pieces of individual 3D compression data, receives the pieces of individual 3D compression data from the encoders and respectively combines the pieces of individual 3D compression data with the corresponding individual configuration information, generates the 3D compression data by multiplexing the combined data, and combines the 3D compression data with the configuration information and outputs the result of the combination.

17. The apparatus of claim 16, wherein the multiplexer generates the configuration information so that the configuration information comprises profile and level identification information of the 3D compression data.

18. The apparatus of claim 17, wherein the multiplexer generates the configuration information so that the configuration information further comprises user data, which defines applications of the 3D compression data.

19. The apparatus of claim 16, wherein the multiplexer generates the individual configuration information so that the individual configuration information comprises a version number of a tool list of a data type of the pieces of individual 3D compression data and a data type code containing information of the data type of the pieces of individual 3D compression data.

20. The apparatus of claim 19, wherein the multiplexer generates the individual configuration information so that the individual configuration information further comprises user data defining applications of the pieces of individual 3D compression data.

21. The apparatus of claim 16, wherein the encoder generates the individual 3D compression data by encoding the received 3D data according to an encoding method matching the data type code of the pieces of individual 3D compression data.

22. The apparatus of claim 16, wherein the multiplexer generates the data type code of the individual 3D compression data so that the data type code further comprises a plurality of bits used in resynchronization.

23. The apparatus of claim 16, wherein the multiplexer generates the configuration information so that the configuration information further comprises user data defining applications of the 3D compression data.

24. An apparatus to recover three-dimensional (3D) compression data, the apparatus comprising:
a demultiplexer which separates the 3D compression data and configuration information of the 3D compression data from a received signal, separates a plurality of pieces of individual 3D compression data and individual configuration information of the pieces of individual 3D compression data from the 3D compression data, and analyzes a data type code comprising data type information of the individual 3D compression data, the data type code being included in the individual configuration information; and
a plurality of decoders which recover 3D graphic data by decoding the pieces of individual 3D compression data according to the corresponding data type code.

25. At least one computer readable medium storing instructions that control at least one processor in a computer to perform a method of generating three-dimensional (3D) compression data, the method comprising:
generating configuration information of the 3D compression data;
generating a plurality of pieces of individual 3D compression data to be included in the 3D compression data and individual configuration information of the pieces of individual 3D compression data;
multiplexing the plurality of individual 3D compression data and the individual configuration information; and
generating the 3D compression data by combining the multiplexed result with the configuration information and outputting the result of the combination.

26. At least one computer readable medium storing instructions that control at least one processor in a computer to perform a method of recovering three-dimensional (3D) compression data, the method comprising:
separating the 3D compression data and configuration information of the 3D compression data from a received signal;
demultiplexing a plurality of pieces of individual 3D compression data and individual configuration information of the pieces of individual 3D compression data from the 3D compression data; and
decoding the pieces of individual 3D compression data using data type information of the 3D compression data, which is included in the individual configuration information.

27. A method of generating three-dimensional (3D) compression data, the method comprising:
generating configuration information of a 3DCObjectSequence, which is the 3D compression data;
generating 3DC Objects, which are a plurality of pieces of individual 3D compression data that are included in the 3D compression data; and
generating the 3D compression data by multiplexing the pieces of individual 3D compression data, combining the 3D compression data with the configuration information, and outputting the result of the combination,
wherein the generation of configuration information of the 3D compression data, the generation of the pieces of individual 3D compression data, and the generation of the 3D compression data are realized by:

```
3DCObjectSequence( ) {
    bit(32) 3dc_object_sequence_start_code;
    bit(8)  profile_and_level_indication;
    do {
        3DCObject( );
        bit(32) *next;
    } while ( next != 3dc_object_sequence_end_code);
    bit(32)  3dc_object_sequence_end_code;
}
``` and wherein 3dc_object sequence_start_code denotes code representing a start of the 3D compression data, profile_and_level_indication denotes profile and level identification information of the 3D compression data, and 3dc_object_sequence_end_code denotes code representing an end of the 3D compression data.

28. The method of 27, wherein the configuration information further comprises user data defining applications of the 3D compression data,
wherein the user data is realized by:

```
user_data( ) {
    bit(23) *next;
    while(next !=0){
        bit(8)   user_data_bits;
        bit(23) *next;
    }
}
``` wherein user_data_bits is an 8-bit integer that is defined for a specific application by a user.

29. The method of 27, wherein the generating of the 3DCObject comprises:

generating individual configuration information of the 3DCObject; and generating the 3DCObjects according to 3dc_object_type start_code which is data type code containing data type information of the 3DCObjects;

wherein the generating of the individual configuration information for the 3DCObject and the generating of the 3DCObject are realized by:

```
3DCObject( ) {
        bit(32)    3dc_object_start_code;
        bit(1)     is__3dc_object_identifier;
        bit(3)     3dc_object_verid;
        bit(4)     3dc_object_priority;
 bit(32)  *next;
 if (next == "Simple_3DMC") {
        bit(32) 3dc_object_type_start_code;
        3D_Mesh_Object( );
 }
 else if (next == "Simple_WSS") {
        bit(32) 3dc_object_type_start_code;
        Wavelet_Mesh_Object( )
 }
 else if (next == "Simple_CI") {
        bit(32) 3dc_object_type_start_code;
        CompressedCoordinateInterpolator( )
 }
 else if (next == "Simple_OI") {
        bit(32) 3dc_object_type_start_code;
        CompressedOrientationInterpolatort( )
 }
 else if (next == "Simple_PI") {
        bit(32) 3dc_object_type_start_code;
        CompressedPositionInterpolator( )
 }
 else if (next == "Simple_BBA"){
        bit(32) 3dc_object_type_start_code;
        bba_object( )
 }
},
``` and wherein 3dc_object_start_code denotes code representing a start of 3DCObject, is __3dc_object_identifier denotes an identifier of 3DCObject 3dc_object_verid denotes code representing identification of a version of 3DCObject, and 3dc_object_priority denotes code representing a priority of 3DCObject.

30. The method of claim 29, wherein the individual configuration information further comprises user data defining applications of the 3DCObject, wherein the user data is realized by:

```
user_data( ) {
        bit(23) *next;
        while(next !=0){
              bit(8) user_data_bits;
              bit(23) *next;
        }
}
``` wherein user_data_bits is an 8-bit integer that is defined for a specific application by a user.

31. The method of claim 29, wherein the 3dc_object_type_start_code comprises:

bits '0000 0000 0000 0000 0000 0001' used in resynchronization; and one of values 'A6' through 'AB', which are 8 bits, as the data type information.

32. A method of generating three-dimensional (3D) compression data, the method comprising:

generating configuration information of the 3D compression data;

generating a combination of individual configuration information of an individual 3D compression object included in the 3D compression data with the individual 3D compression object corresponding to the individual configuration information, and repeatedly generating the combination; and multiplexing the combinations to obtain a piece of data, and including the configuration information in the obtained data.

33. A method of recovering three-dimensional (3D) compression data, the method comprising:

separating the 3D compression data and configuration information of the 3D compression data from a received signal;

separating combinations of individual configuration information and individual 3D compression objects from the 3D compression data, and separating the individual 3D compression objects and the individual configuration information from the separated combinations; and recovering 3D data by decoding the individual 3D compression objects using data type information of the individual 3D compression objects, the data type information being included in the individual configuration information.

34. A method of generating three-dimensional (3D) compression data which includes individual 3D compression objects, the method comprising:

generating a plurality of the individual 3D compression objects;

generating individual configuration information for each of the individual 3D compression objects; and multiplexing each of the individual 3D compression objects and individual configuration information corresponding to each of the individual 3D compression objects.

35. A method of recovering three-dimensional (3D) compression data, the method comprising:

demultiplexing a plurality of individual 3D compression objects and individual configuration information corresponding to each of the individual 3D compression objects, from a received signal;

separating the individual 3D compression objects and each of the corresponding individual configuration information from the 3D compression data; and decoding the individual 3D compression objects according to data type information included in the individual configuration information.

* * * * *

UNITED STATES PATENT AND TRADEMARK OFFICE
CERTIFICATE OF CORRECTION

PATENT NO.        : 7,532,133 B2
APPLICATION NO.   : 11/401412
DATED             : May 12, 2009
INVENTOR(S)       : Jeonghwan Ahn et al.

It is certified that error appears in the above-identified patent and that said Letters Patent is hereby corrected as shown below:

Column 9, Line 55, after "data;" delete "and".

Column 10, Line 45, after "of the" delete "of the" (Second Occurrence).

Column 12, Line 45, change "3dc_object sequence_start_code" to
--3dc_object_sequence_start_code--.

Column 13, Line 5-6, change "3dc_object_type start_code" to
--3dc_object_type_start_code,--.

Column 13, Line 43, change "3DCObject" to --3DCObject,--.

Column 13, Lines 49-50, change
"applications of the 3DCObject, wherein the user data is realized by:" to
--applications of the 3DCObject,
Wherein the user data is realized by:--.

Column 14, Lines 5-7, change
"; and one of the values 'A6' through 'AB', which are 8 bits, as the data type
information." to
--; and
one of the values 'A6' through 'AB', which are 8 bits, as the data type information.--.

Column 14, Line 19, after "including" delete "the".

Signed and Sealed this

Twenty-fourth Day of November, 2009

David J. Kappos
*Director of the United States Patent and Trademark Office*